(12) United States Patent
Damm

(10) Patent No.: US 7,673,883 B2
(45) Date of Patent: Mar. 9, 2010

(54) METHOD AND DEVICE FOR WHEEL CAMBER ADJUSTMENT

(75) Inventor: Jurgen Damm, Berlin (DE)

(73) Assignee: CNH Baumaschinen GmbH, Staakener Strabe, Berlin (DE)

( * ) Notice: Subject to any disclaimer, the term of this patent is extended or adjusted under 35 U.S.C. 154(b) by 818 days.

(21) Appl. No.: 10/543,769

(22) PCT Filed: Jan. 23, 2004

(86) PCT No.: PCT/DE2004/000094

§ 371 (c)(1),
(2), (4) Date: Jun. 6, 2006

(87) PCT Pub. No.: WO2004/069569

PCT Pub. Date: Aug. 19, 2004

(65) Prior Publication Data

US 2006/0220335 A1    Oct. 5, 2006

(30) Foreign Application Priority Data

Feb. 7, 2003    (DE) ................................. 103 04 916

(51) Int. Cl.
*B60G 3/26*    (2006.01)
*B62D 17/00*   (2006.01)

(52) U.S. Cl. ................. 280/5.521; 280/86.751

(58) Field of Classification Search ............... 180/433, 180/436; 280/5.521, 86.751, 86.757, 124.111–124.113
See application file for complete search history.

(56) References Cited

U.S. PATENT DOCUMENTS 2,907,578 A * 10/1959 Taber ..................... 280/5.508
3,398,808 A     8/1968 Heckenhauer
3,783,966 A     1/1974 Cambell
4,371,191 A *  2/1983 Goldberg et al. ......... 280/5.501
4,700,972 A * 10/1987 Young ..................... 280/5.521
4,796,720 A *  1/1989 Bauer ......................... 180/234
5,292,149 A *  3/1994 Luger ..................... 280/5.521
6,170,838 B1 * 1/2001 Laurent et al. ........... 280/5.508

(Continued)

FOREIGN PATENT DOCUMENTS

CH            586 621 A        4/1977

*Primary Examiner*—Paul N Dickson
*Assistant Examiner*—Laura Freedman
(74) *Attorney, Agent, or Firm*—Patrick M. Sheldrake; John William Stader; Michael G. Harms

(57) ABSTRACT

The invention concerns a method and a device for the adjustment of wheel camber in commercial vehicles, particularly wheeled construction vehicles used for earthworks, particularly on uneven ground. The camber angle is set inventively and automatically by means of a camber cylinder and a wheel pivot unit, as a function of at least one of the driving parameters. For this purpose, the driving parameters, e.g. the axle swing angle, the steering lock angle, the lateral force on the vehicle wheels on the front axle and the absolute inclination of the construction vehicle are detected by sensors, the output signals of which are fed to an electronic control unit as input parameters. The camber angle sets itself as a function of the setting signal from the electronic control unit by means of a camber cylinder and a wheel pivot unit, in accordance with specified control strategies. As well as the self-setting wheel camber adjustment system, the camber cylinder is embodied so that it can still be operated manually.

9 Claims, 3 Drawing Sheets

U.S. PATENT DOCUMENTS

| | | | |
|---|---|---|---|
| 6,267,387 B1 * | 7/2001 | Weiss | 280/5.52 |
| 6,279,920 B1 * | 8/2001 | Choudhery | 280/5.521 |
| 6,293,561 B1 * | 9/2001 | Goetzen et al. | 280/5.52 |
| 6,386,553 B2 * | 5/2002 | Zetterstrom | 280/5.51 |
| 6,511,078 B2 * | 1/2003 | Sebe | 280/5.509 |
| 6,776,426 B2 * | 8/2004 | Deal | 280/86.751 |
| 2001/0028154 A1 | 10/2001 | Sebe | |

* cited by examiner

METHOD AND DEVICE FOR WHEEL CAMBER ADJUSTMENT

FIELD OF THE INVENTION

The present invention concerns a method and a device for the adjustment of wheel camber in commercial vehicles, particularly wheeled construction vehicles used for earthworks, particularly on uneven ground.

BACKGROUND OF THE INVENTION

The kinematics of the chassis when load changes occur, traversing curves and earthworks with loads acting at right angles to the direction of travel, which contribute to directional stability and adhesion, are becoming the focus of further developments with the trend towards higher speeds of travel, increased productivity and greater convenience.

In graders, the chassis is particularly characterized by: the wheelbase, the gauge, the toe-in and camber behavior and other important key variables.

The camber, or relative inclination of the wheel plane to the perpendicular of the carriageway, assumes particular significance for tracking and steering, as a negative camber increases the force acting at right angles to the direction of travel by the force gained from the camber. The camber is of further significance in reducing the turning circle of the vehicle and tire wear, and in the alignment of the front wheels after the front axle has levelled off when the ground profile changes.

Possibilities of electronic and self-setting camber adjustment for cars are known from DE 40 20 5471 A1, in which the tie rod of the adjustment device and a wheel radius arm are borne, by means of a rocker arm on ball bearings on the wheel trunk, on a horizontal axis running in the longitudinal direction of the vehicle so that they may swivel about it. This means that the longitudinal forces arising can be absorbed separately. The advantage is that a lower tire pressure can be used, leading to a considerable increase in comfort when traversing curves and proceeding in a straight line (particularly at high speeds, due to minimal changes in the position of the wheels due to spring travel). The application of this existing invention to commercial vehicles, particularly wheeled construction vehicles, is precluded from the outset by the significant, generic differences between the design features of a car axle and a front axle of a construction vehicle, and also because of the associated task.

The camber adjustment in commercial vehicles, particularly graders, is usually applied to a camber cylinder mounted on a front swing axle, which aligns a wheel pivot unit by moving in and out. Adjustment of the camber angle has hitherto been manual.

A disadvantage of this existing design is that the camber angle is also adjusted as a function of the swing angle of the front axle, as the front axle and camber cylinder are directly connected to each other. Manual adjustment is necessary, particularly after a front wheel sinks into a depression or when working on embankments. As in all such cases after the aforementioned sinking of the construction vehicle, the wheel camber has to be restored to its position by the driver operating the relevant hydraulic function. It is noted that the initial working path is completed at a camber angle which is unfavourable to the driving behavior of the vehicle. This is due to the fact that the driver cannot carry out manual camber adjustment and adjust the functions of the machine at the same time.

The purpose of the present invention is: to provide automatic camber adjustment for commercial vehicles as a function of the changing ground profile, to aid the driver in increased load situations, and to be able to continuously guarantee an optimum camber angle or one specified by the driver. This automatic wheel camber adjustment system is also intended to reduce the turning circle of the construction vehicle thus improving steering characteristics without encumbering the driver with secondary, vehicle-specific tasks.

The camber angle is set inventively and automatically, by means of a camber cylinder and a wheel pivot unit, as a function of at least one of the driving parameters, e.g. the axle swing angle, the steering lock angle, lateral forces acting on the vehicle wheels on the front axle and the absolute inclination of the construction vehicle in relation to a horizontally-aligned carriageway. Regulation and control of the extendable and retractable camber cylinder are by means of an electronic control unit. Alternatively, the camber cylinder may also continue to be adjusted manually. As adjustment of the camber cylinder is not necessarily characterized by a closed control circuit or control system, the term "control" is also used below for self-setting of the camber cylinder.

The camber cylinder is mechanically connected to an actuator, which moves the camber cylinder along a specified path in a certain time using secondary electrical and/or pneumatic and/or hydraulic energy, positioning it with a certain degree of accuracy, if necessary. This actuator should preferably take the form of a valve.

The driving parameters are advantageously detected by sensors and the output signals of said sensors fed to the electronic control unit as input parameters. These sensors are at the front of the vehicle, particularly on the front swing axle, on the frame of the vehicle, on the camber cylinder or on the wheel pivot unit. As the roll dynamics of a grader are assumed by the rear axle, which is rigidly connected with the vehicle frame but not described in more detail, only the camber of the front wheels is adjusted accordingly.

A further sensor to detect the axle swing angle may be required to solve the inventive problem, depending upon the local arrangement of the sensor for detecting the angle of inclination. This necessity will arise if the sensor for detecting the angle of inclination is mounted on the vehicle frame instead of the wheel pivot unit. The signals from all the sensors are connected to the electronic control unit as secondary variables. The variable to be controlled in this case is the camber angle. The sensors, the adjustment device, the signal leads and the electronic control unit are constituent parts of the control circuit. The sensors measure the path, angle, forces or differences in them and convert this information into a standardized electrical signal. The adjustment device includes the electrically-actuatable valve as the actuator and the camber cylinder and wheel pivot unit as the final controlling element.

The electronic control unit has an independent transmission function for each detectable driving parameter or signal from the sensor. This means that the individual driving parameters can be weighted differently for adjustment of the camber angle. As each change in the signal of each individual detectable driving parameter is based upon a specific transmission function, these driving parameters do not enter the electronic control system as interference variables, but as secondary variables.

A particular advantage of the current invention is the fact that the camber angle is self-setting, the consequence of which is that, on one hand, the camber angle is set optimally, either continuously or within a range of settings, at any time during driving, and, on the other hand, even a less experienced driver can be relieved of secondary, vehicle-specific tasks. This relief ensures that the driver can concentrate on the operating functions, namely adjusting the operation of the construction vehicle itself or that of the relevant devices.

Other potential advantages of the present invention include: lower tire wear than in construction vehicles with non-automatic camber angle adjustment, and decreased turning circle.

The sensors utilized in the present invention are of very strong construction, so that they provide the information necessary for automatic wheel camber adjustment, even under high mechanical and temperature stresses.

In a preferred embodiment of the invention, the camber adjustment system is based on a constant value control system. The camber angle setting is specified by the driver of the construction vehicle or by the vehicle itself within admissible limits and is continuously adjusted by the electrical control unit as a function of the swing angle of the front axle. The camber angle thus remains constant, independent of the changing ground profile and thus of the axle swing angle. The swing angle of the front axle is inventively detected by a sensor which directly or indirectly determines the angle of the front axle to the vehicle frame. Alternatively, this control strategy may be implemented by a sensor detecting the absolute angle of inclination of the wheel pivot unit in relation to a horizontally-aligned carriageway. The angle of inclination of the carriageway may then be used to allow for an optimum camber angle. The processing of these measured values is undertaken inventively by the electronic control unit.

"Sliding" camber adjustment takes place in a further preferred embodiment of the invention. In the "sliding" control system, the self-setting camber angle can be adjusted variably within an admissible, adjustable setting or control range. For this purpose, the steering lock angle and/or the lateral force acting on the front wheels is determined and the camber angle adjusted optimally within the admissible range of settings. The camber angle is thus within a specific range of settings, depending upon the steering lock angle and/or the lateral forces from the plough. The steering lock angle and the lateral force from the plough are detected by sensors and the standardized signals converted from their respective measured values sent to the electronic control unit.

There is also a possibility of detecting the camber of the carriageway by means of an additional angle sensor mounted on the wheel camber articulated joint or on the vehicle frame of the construction vehicle. This angle sensor detects the absolute inclination of the construction vehicle compared to a horizontally-aligned carriageway. The radial forces acting on the front axle can also thus be detected indirectly by this angle sensor. The signals from the angle sensor enter the electronic control unit as secondary variables. Wheel camber adjustment or self-setting takes place by means of a transmission function and additional control strategies.

An additional inventive control strategy for adjusting the camber angle is that the signals for all the detectable driving parameters enter the electronic control unit as secondary variables and that constant or "sliding" control of the camber angle takes place as a function of the specified weighting of the individual driving parameters.

In many western countries, vehicle drivers are obliged to obey road traffic rules when construction machinery travels on the public highway. The possibility of both continued manual and automatic adjustment is therefore necessary in practice. A desired camber angle, which takes priority over the camber angle determined in automatic mode, is sent to the control system by means of a detector. In this case, the changeover takes place by means of an automatic/manual switch, which completely prevents the flow of signals from the sensors in the corresponding position on one hand and, on the other hand, only sends signals from the manual operation system to the electronic control unit. Signals which vary because of the driving status are suppressed. The camber consequently remains at a set angle following manual setting by the driver. An on/off switch is provided in the driver's cab for switching off all camber angle adjustment, i.e. whether manual or automatic. The camber angle set is thus fixed and can only be readjusted or reset after release has taken place.

DETAILED DESCRIPTION OF THE EXEMPLARY EMBODIMENTS

Figure 1:
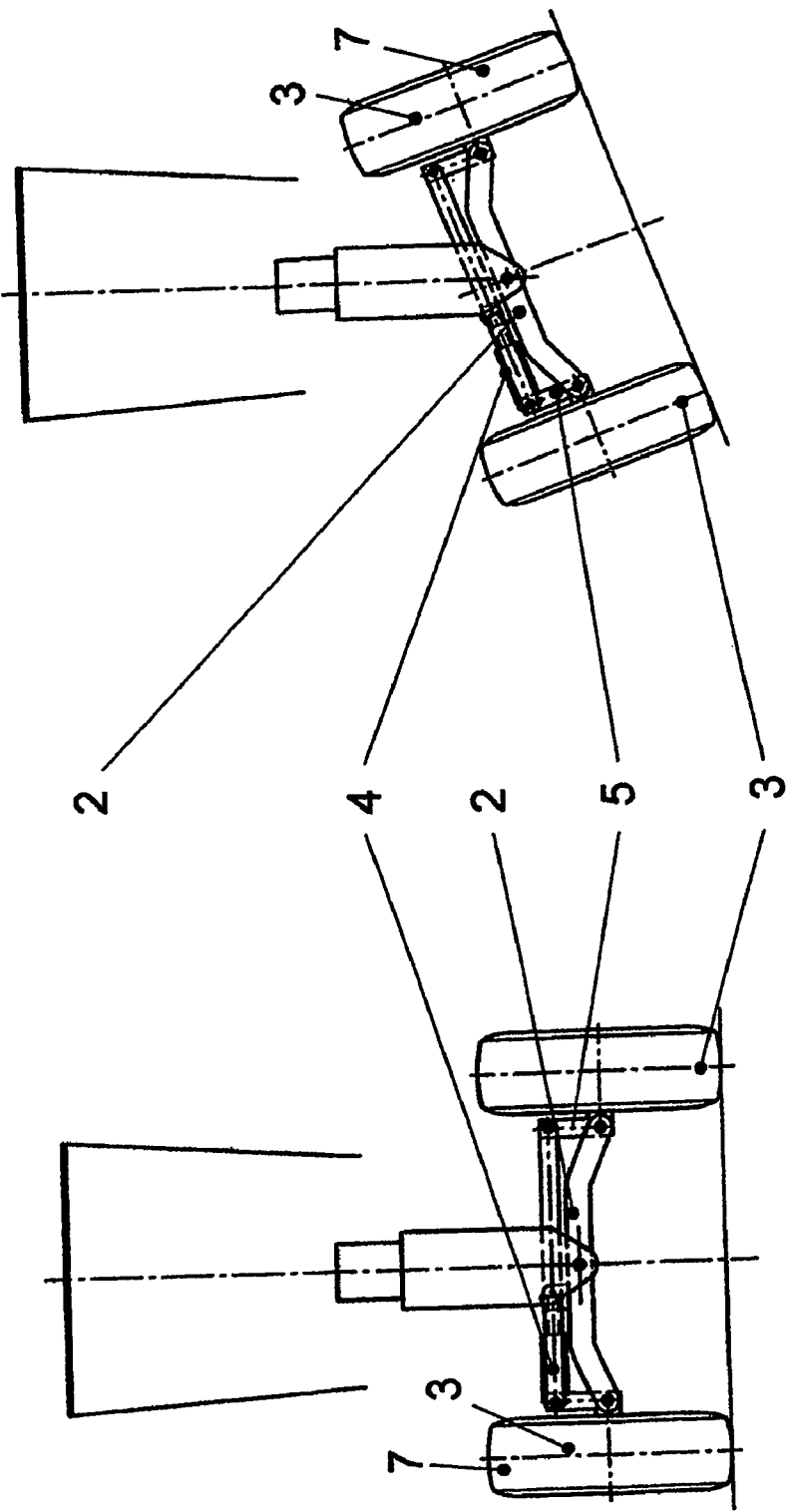
FIG. 1a shows a front elevation view of an axle on a flat carriageway.
FIG. 1b shows a front elevation view of an axle on an inclined carriageway.

FIG. 1a and FIG. 1b illustrate the camber adjustment system in accordance with the present invention. In this case, the camber angle is adjusted manually by means of a camber cylinder 4, which is mechanically connected to a wheel pivot unit 5. The wheel pivot unit 5 is moved by the extension and retraction of the camber cylinder 4 and the relative angle between the wheel plane 3 of the vehicle wheel and the perpendicular of the carriageway is thus changed. The camber cylinder 4 has a releasable connection with the front axle 2 and is arranged in parallel to the latter and to the carriageway. If there is a terrain-dependent inclination of the carriageway, the front axle 2 and the camber cylinder 4 arranged in parallel to it will follow the inclination of the carriageway. The camber cylinder 4 and the wheel pivot unit 5 are at right angles to each other in the case of both a flat and an inclined carriageway. The camber angle is the same in both cases.

Figure 2:
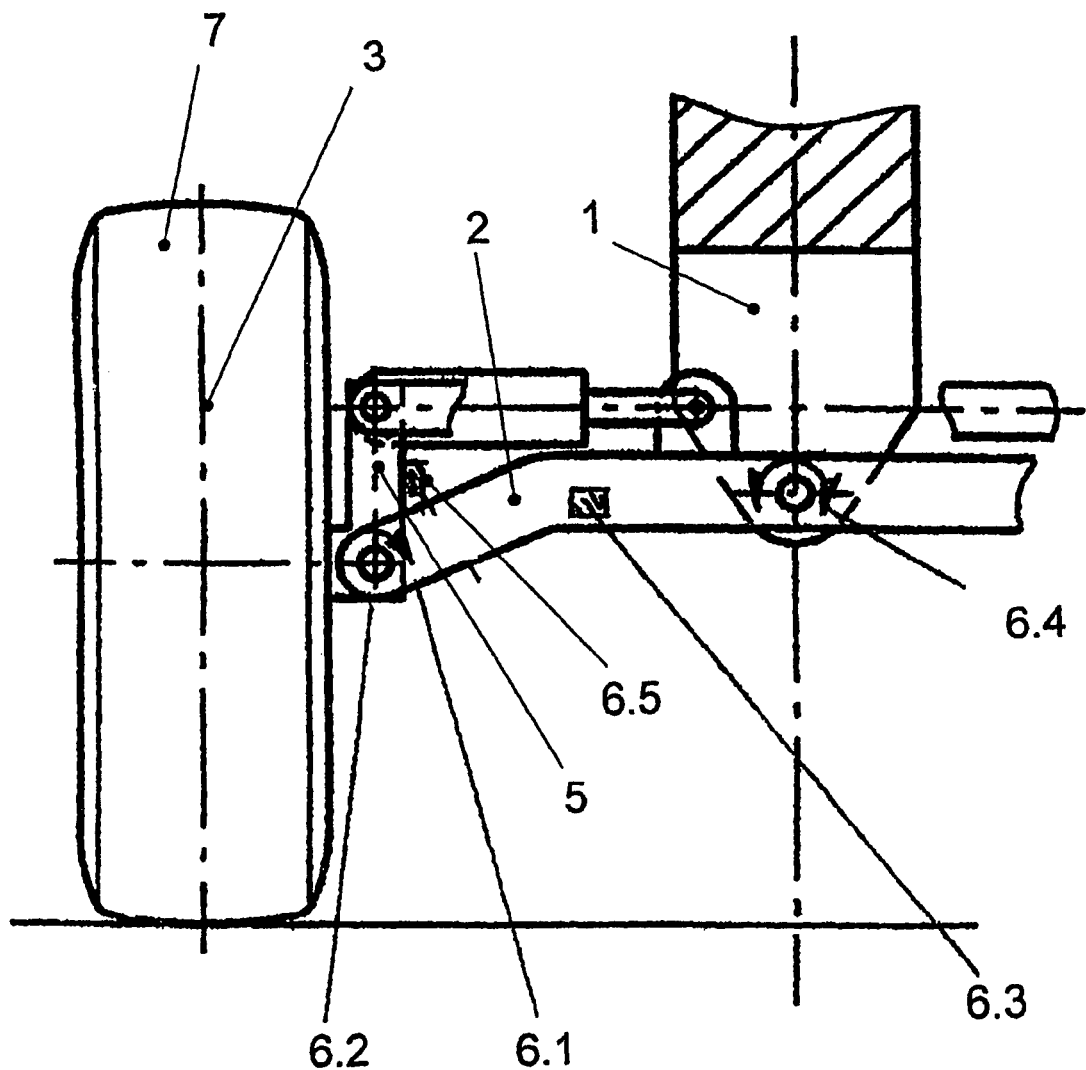
FIG. 2 shows an arrangement of sensors around the front axle.

FIG. 2 shows the advantageous arrangement of the sensors 6 in the vicinity of the front axle 2. To solve the problem in accordance with the invention at least one sensor is used to detect the camber angle 6.1, one sensor to detect the steering lock angle 6.2, one sensor to detect lateral force 6.3, one sensor to detect the axle swing angle 6.4 and one sensor to detect the absolute inclination of the construction vehicle or the front axle to the perpendicular of the carriageway. The sensor for detecting the axle swing angle 6.4 is mounted on the front axle 2 in the vicinity of the vehicle frame 1. As the front axle 2 and the vehicle frame 1 are mutually perpendicular on a flat carriageway, every angle which differs from 90° between the front axle 2 and vehicle frame 1 represents axle swing. The sensor for detecting the camber angle 6.1 is mounted on the front axle 2 in the vicinity of the wheel pivot unit 5, whereby said camber angle is the variable to be fully adjusted. The lateral forces acting on the vehicle wheels 7 on the front axle 2 are detected by a further sensor, also mounted on the front axle 2. The steering lock angle is detected by a sensor 6.2, which is suitably mounted on the front axle 2. The absolute angle of inclination of the construction vehicle is detected by a further sensor 6.5, which may be used instead of sensors 6.1 to 6.4. This sensor 6.5 detecting the angle of inclination may be mounted at any point on the construction vehicle.

As the standardized signals of all the sensors are generated and processed independently of each other, there is a guarantee that self-setting camber angle adjustment will nevertheless take place in the event of a fault occurring in or deactivation of an individual sensor. This redundant camber angle adjustment is carried out by the electronic control unit 9 shown in FIG. 3.

Figure 3:
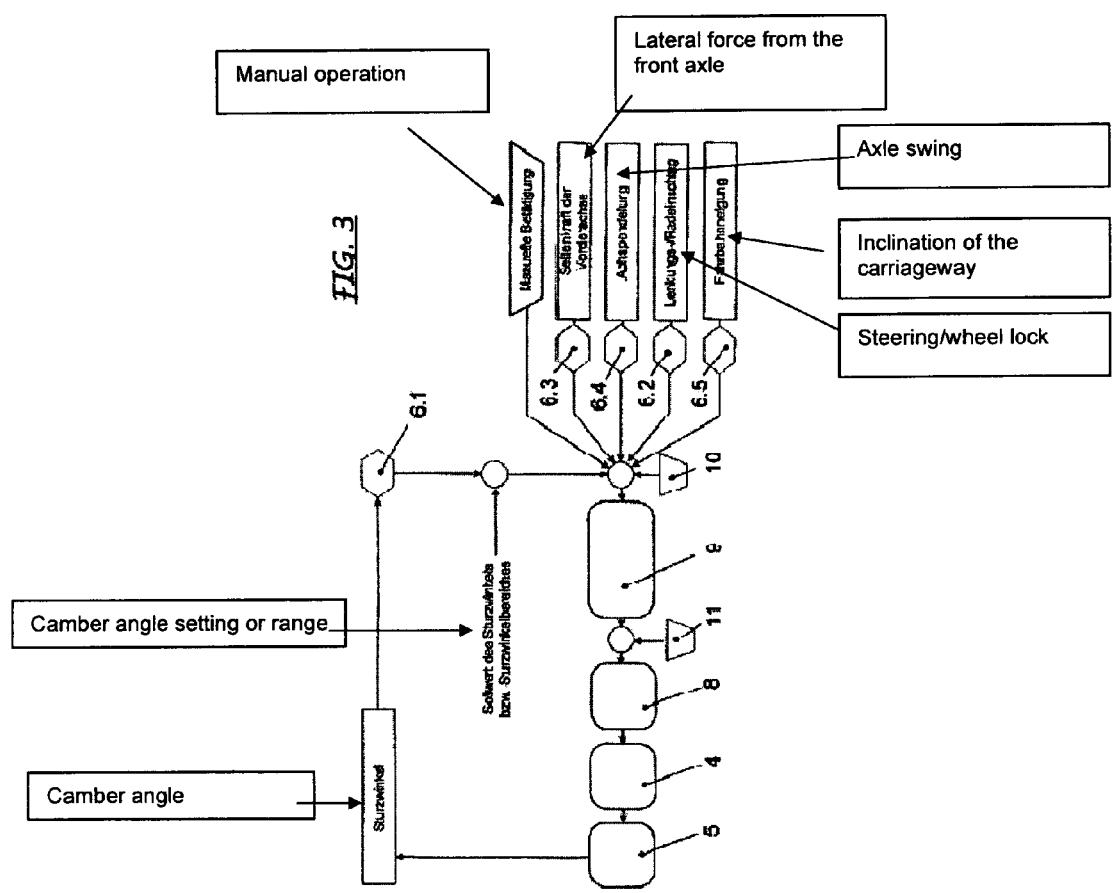
FIG. 3 shows a control circuit and signal flow diagram.

FIG. 3 shows the combined effect of the components of the control circuit. The diagram shown is based on functional aspects, not layout. The adjustment device includes the actuator 8, the camber cylinder 4, and the wheel pivot unit 5 as the final controlling element. The camber cylinder 4 and the wheel pivot unit 5 extend and retract, thus setting the camber angle as a function of the load on the actuator. The sensor for detecting the camber angle 6.1 continuously determines the camber angle and delivers the corresponding information to the electronic control unit 9. The controller consists of the electronic control unit 9 and the comparing element. The standard deviation from the camber angle setting is determined in the comparing element. Additional secondary variables for forming the output signal in the electronic control unit 9 are the lateral force of front axle 2, the axle swing angle, the steering lock angle, and the absolute inclination of the construction machine in relation to the perpendicular of the carriageway. The electronic control unit 9 is capable of suitably processing the standardized signals of sensors 6.1 to 6.5, which measure angles or forces, depending upon their task. A transmission function is allocated to each standardized signal in the electronic control unit 9 for this purpose. The output signal for actuating the adjustment device or final controlling element, the camber cylinder 4, and wheel pivot unit 5 is formed by superimposing the individual transmission functions and their weightings on each other. In specific cases of use, individual sensors 6.1 to 6.5 can be switched off, so that the output signal for actuating the adjustment device is formed by the sensors 6.1 to 6.5 in operation.

The self-setting, automatic camber adjustment system can be deactivated by a changeover switch 10 and the camber angle adjustment thus made manually. In manual mode, the standardized signals from the sensors 6.1 to 6.5 are thus ignored for the purposes of camber angle adjustment.

An on/off switch 11 is provided in the driver's cab for switching off all camber angle adjustment, i.e. whether manual or automatic. The camber angle set is thus fixed and can only be adjusted or reset after release has taken place.

It will be obvious to a person skilled in the art that the electronic control unit is also capable of compensating for additional interference which may occur and cannot be specified in more detail, in order to keep a camber angle set constant or to control the camber angle within a certain camber angle range.

What is claimed is:

1. A device for the adjustment of wheel camber on commercial wheeled vehicles with an axle, comprising:

a camber cylinder directly articulated at a first end to and directly acting upon a wheel pivot unit separately from the frame and the camber cylinder connected at a second end to the axle;

an electronic control unit having at least one sensor and an actuator linked to the electronic control unit with a mechanical connection to the camber cylinder, the electronic control unit configured to control the camber cylinder to extend and retract so that an identical camber angle for both wheels on one axle is set automatically and simultaneously as a function of at least one driving parameter.

2. A device for the adjustment of wheel camber on commercial vehicles as described in claim 1, wherein the wheel camber adjustment device can also be set manually.

3. A device in accordance with claim 1, further comprising a sensor mounted on the front axle and configured to detect the camber angle relative to a carriageway.

4. A device in accordance with claim 1, further comprising a sensor configured to detect the steering lock angle relative to a carriageway and the least one driving parameter is the steering lock angle.

5. A device in accordance with claim 1, further comprising a sensor configured for determining the lateral force relative to a carriageway and the least one driving parameter is the lateral force.

6. A device in accordance with claim 1, further comprising a sensor configured for determining the axle swing angle relative to a carriageway and the at least one driving parameter is the axle swing angle, wherein the axle swing angle is the angle between the axle and the frame.

7. A device in accordance with claim 1, further comprising a sensor configured for determining the absolute angle of inclination of the vehicle and the at least one driving parameter is the absolute angle of inclination.

8. A device in accordance with claim 1, wherein the actuator mechanically connected to the camber cylinder takes the form of a valve with or without secondary energy.

9. A device in accordance with claim 1, further comprising the electronic control unit having at least two sensors configured to detect at least two of the following driving parameters: an axle swing angle between the axle and vehicle frame, a steering lock angle, lateral forces acting on the vehicle wheels on the front axle and the absolute inclination of the vehicle in relation to a horizontally-aligned carriageway;

the electronic control unit configured to process the parameters into a signal for controlling the camber cylinder, wherein the electronic control unit is configured to associate an independent processing weight to each driving parameter.

* * * * *